(Model.)
M. R. REEVES.
MINCING KNIFE.
No. 251,378. Patented Dec. 27, 1881.
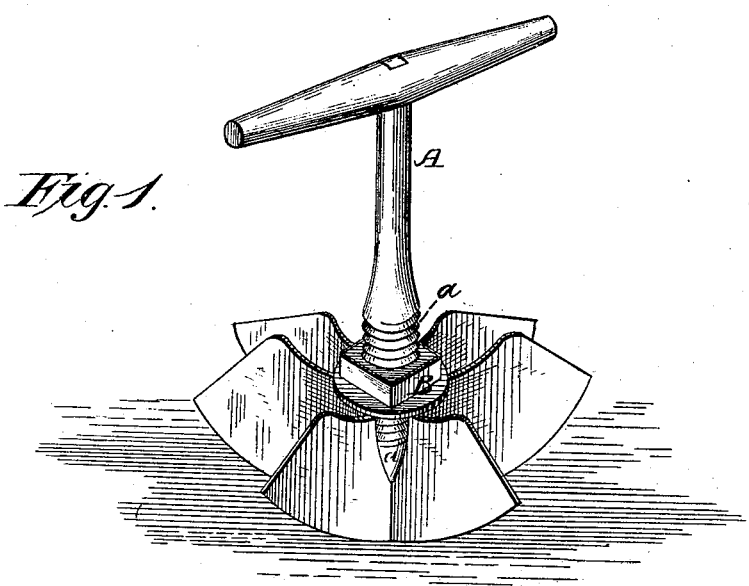
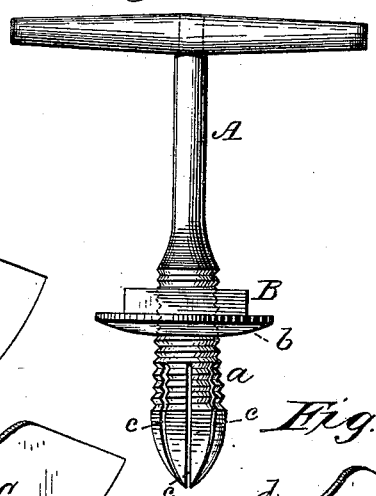
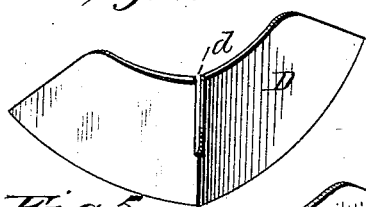
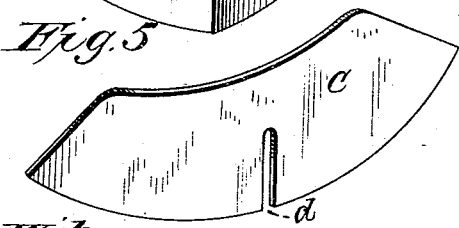
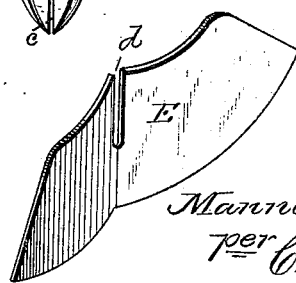
Witnesses.
Franck L. Ouraud
S. L. Miller
Inventor.
Mannassah R. Reeves,
per Chas. H. Fowler
Attorney

UNITED STATES PATENT OFFICE.

MANNASSAH R. REEVES, OF GRENOLA, KANSAS.

MINCING-KNIFE.

SPECIFICATION forming part of Letters Patent No. 251,378, dated December 27, 1881.

Application filed November 9, 1881. (Model.)

*To all whom it may concern:*

Be it known that I, MANNASSAH R. REEVES, a citizen of the United States, residing at Grenola, in the county of Elk and State of Kansas, have invented certain new and useful Improvements in Mincing-Knives; and I do hereby declare that the following is a full, clear, and exact description of the same, reference being had to the annexed drawings, making a part of this specification, and to the letters and figures of reference marked thereon.

Figure 1 of the drawings is a perspective view of a mincing-knife constructed in accordance with my invention. Fig. 2 is a detailed view of the handle and clamping-nut, and Figs. 3, 4, and 5 are detailed views of the blades.

The present invention has relation to certain new and useful improvements in knives for mincing meat, vegetables, fruit, and other food into small fragments; and it consists in the details of construction, substantially as shown in the drawings, and hereinafter described.

In the accompanying drawings, A represents the handle, formed at its lower end with a screw-shank, $a$, for the reception of a clamping-nut, B, having a convex under surface, $b$, to conform to the curvature of the upper edges of the cutting-blades C D E.

The screw-threaded shank $a$ is slitted, as shown at $c$, for the reception of the upper edges of the blades, each of said blades having a slot, $d$, by means of which they are connected together.

The blade C, as will be seen, is straight, while the blades D E are bent so as to form an obtuse angle, as shown in Figs. 3 and 4. Thus when the blades are connected together the ends thereof will stand out radially from a given center, as illustrated in Fig. 1, the lower edges of the blades being curved.

In connecting the blades together the flat or straight blade C is first slipped over the edge of the blade D, the upper portion thereof above the slot $d$ resting within the slot of the blade D, after which the blade E is connected in like manner to said blade D. When the blades are thus connected together and the ends thereof brought and held at the proper angle with relation to each other, the slitted end of the screw-threaded shank $a$ is pressed down and over the edges of the blades, which enter the slits $c$, and are firmly held therein by the nut B, which is screwed down until the convex surface $b$ is brought in contact with the curved edges of the blades. The nut B, as it is screwed down, contracts the slitted end of the shank and securely clamps and firmly holds the blades in position, while the convex surface $b$ forms a bearing for the upper edges of the blades and prevents their splitting the shank of the handle when the device is being used.

The blades may be easily removed and separated for cleaning, sharpening, and repairing by screwing up the nut B.

The peculiar form of the blades D E, in connection with the blades C, when together, form a series of cutting-edges that will perform the office of chopping or mincing the food in a very expeditious manner.

Having now fully described my invention, what I claim as new, and desire to secure by Letters Patent, is—

1. In a mincing-knife, the combination, with a suitable handle, of the slotted straight blade C and slotted blades D E, bent at an obtuse angle, as shown, and connected together and to the handle, substantially as and for the purpose set forth.

2. The combination, with the blades C D E, of the handle A, having a screw-threaded shank, $a$, with slits $c$, and the screw-nut B, substantially as and for the purpose specified.

In testimony that I claim the above I have hereunto subscribed my name in the presence of two witnesses.

MANNASSAH RALPH REEVES.

Witnesses:
JOHN D. KOHER,
W. H. CRAWFORD.